United States Patent
Oukassi et al.

(10) Patent No.: US 8,475,963 B2
(45) Date of Patent: Jul. 2, 2013

(54) LITHIUM MICROBATTERY AND FABRICATION METHOD THEREOF

(75) Inventors: Sami Oukassi, Grenoble (FR); Raphael Salot, Lans-en-Vercors (FR); Nicolas Dunoyer, Grenoble (FR); Steve Martin, Saint-Sauveur (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 0 days.

(21) Appl. No.: 13/203,796

(22) PCT Filed: Mar. 4, 2010

(86) PCT No.: PCT/EP2010/052778
§ 371 (c)(1),
(2), (4) Date: Aug. 29, 2011

(87) PCT Pub. No.: WO2010/105917
PCT Pub. Date: Sep. 23, 2010

(65) Prior Publication Data
US 2011/0311883 A1 Dec. 22, 2011

(30) Foreign Application Priority Data
Mar. 16, 2009 (FR) .................................... 09 01217

(51) Int. Cl.
*H01M 6/18* (2006.01)
(52) U.S. Cl.
USPC .......................................... 429/322; 429/211
(58) Field of Classification Search
USPC .... 429/231.95, 322, 211; 204/192.15; 216/13
See application file for complete search history.

(56) References Cited

U.S. PATENT DOCUMENTS

| 5,314,765 | A | 5/1994 | Bates |
| 6,168,884 | B1 | 1/2001 | Neudecker et al. |
| 7,462,419 | B2 * | 12/2008 | LaFollette et al. ............ 429/122 |

(Continued)

FOREIGN PATENT DOCUMENTS

| FR | 2 430 103 A1 | 1/1980 |
| WO | WO 01/73873 A1 | 10/2001 |
| WO | WO 2008/011061 A1 | 1/2008 |

OTHER PUBLICATIONS

Jeon et al., "Characterization of All-Solid-State Thin-Film Batteries with $V_2O_5$ Thin-Film Cathodes Using Ex Situ and In Situ Processes," Journal of The Electrochemical Society, 2001, pp. A318-A322, vol. 148—No. 4.

International Search Report mailed May 28, 2010 issued in International Patent Application No. PCT/EP2010/052778 (with translation).

*Primary Examiner* — Mark F Huff
*Assistant Examiner* — Monique Wills
(74) *Attorney, Agent, or Firm* — Oliff & Berridge, PLC

(57) ABSTRACT

The microbattery is formed by a stack of solid thin layers on a substrate which, starting from the substrate, successively comprises a first electrode, a solid electrolyte and a second electrode/current collector assembly. A first surface and a second surface of the electrolyte are respectively in contact with a main surface of the first electrode and a main surface of the second electrode/current collector assembly. The dimensions of the main surface of the first electrode are smaller than the dimensions of the main surface of said assembly, and the dimensions of the first surface of the solid electrolyte are smaller than the dimensions of the second surface of the solid electrolyte. The solid electrolyte is furthermore not in contact with the substrate.

23 Claims, 5 Drawing Sheets

U.S. PATENT DOCUMENTS

2008/0032200 A1* 2/2008 Bates ............................ 429/322
2008/0032236 A1 2/2008 Wallace et al.
2008/0153000 A1 6/2008 Salot et al.
2010/0055573 A1* 3/2010 Lee et al. ...................... 429/322

* cited by examiner

LITHIUM MICROBATTERY AND FABRICATION METHOD THEREOF

BACKGROUND OF THE INVENTION

The invention relates to a lithium microbattery formed by a stack of solid thin layers on a substrate. Starting from the substrate, the stack successively comprises a first electrode, a solid electrolyte and a second electrode/current collector assembly formed by at least one thin layer, a first surface and a second surface of the electrolyte being in contact respectively with a main surface of the first electrode and a main surface of the second electrode/current collector assembly. The main surfaces are facing one another and the dimensions of the main surface of the first electrode are smaller than the dimensions of the main surface of the assembly.

The invention also relates to a fabrication method of such a microbattery.

STATE OF THE ART

Lithium microbatteries, also called "all-solid-state" batteries, are storage batteries which comprise two electrodes implementing lithium. Hybrid systems also exist which only comprise a single electrode implementing lithium. Lithium microbatteries are based on the principle of insertion and extraction of $Li^+$ ions in at least one electrode. Generally, the positive electrode comprises at least one material able to insert a certain number of $Li^+$ cations in its structure.

Lithium microbatteries are particularly interesting on account of their high mass density, their high useful energy storage surface and their low toxicity. Lithium microbatteries are however very sensitive to air and in particular to moisture. In order to protect the active stack of the lithium microbattery, packaging is generally performed to isolate the stack from external contact thereby preventing any contamination originating from the environment.

The microbatteries are in the form of a stack of solid thin layers successively deposited on a substrate by conventional techniques used in the micro-electronics industry, in particular by physical vapor deposition (PVD) or chemical vapor deposition (CVD).

The architecture of the lithium microbattery is then achieved by etching patterns on the different thin layers forming the stack. Definition of the lithium battery patterns is performed by means of two major methods. A first method involves mechanical masking in which the active material forming the thin layer is deposited through masks of stencil type. The latter are generally made from metal and are designed to define the final shape of the different elements constituting the microbattery. Generally not very efficient for masking microbatteries of small size, in particular of millimetric dimensions, mechanical masking also induces risks of particulate contamination and damage of the thin layer. Implementation of this method is complex resulting in it not being able to meet the yield demands of industry. Furthermore, this masking method also does not meet the dimensional specifications of the future generations of integrated circuits, and is consequently hardly suitable for application in the microelectronics field.

The second method is a microfabrication method which implements technological bricks originating from the microelectronics field. This method consists in full wafer deposition of the material forming the thin layer, and in then forming a mask by photolithography on the thin layer, and finally in transferring the pattern into the thin layer by etching through the mask. Photolithography consists in applying a photoresist in the form of a thin layer on the surface of a target layer, for example made from silicon or silicon dioxide, and in then exposing it to light radiation. A developer then enables the exposed photoresist (positive resin) or non-exposed photoresist (negative resin) to be eliminated thereby baring certain parts of the target layer. Although this microfabrication method enables the dimensional limits to be pushed back and the resolution of the patterns to be increased, it does however remain complex with the use of several layers of masks and of non-aqueous solutions which are sometimes incompatible with the active materials of the stack. These shortcomings generally result in deterioration of the functional interfaces between the different layers constituting the stack.

However, as underlined by E. J. Jeon et al. in their article "Characterization of All-Solid-State Thin-Film Batteries with $V_2O_5$ Thin-Film Cathodes Using Ex Situ and In Situ Processes" (Journal of The Electrochemical Society, 2001, 148 (4), P. A318-A322), the electrochemical properties of a microbattery are very closely linked to its structure, and in particular to the quality of the interface between the thin layer, for example made from vanadium pentoxide ($V_2O_5$), constituting the positive electrode and the thin layer, for example made from lithium and phosphorous oxynitride (LiPON), forming the electrolyte.

Different microbattery architectures exist, in particular architectures with symmetric and dissymmetric electrodes.

A microbattery with a symmetric structure comprises a stack formed by a cathode, a solid electrode and a lithium anode. The electrolyte in contact with the negative electrode and the positive electrode respectively forms a first interface and a second interface. The dimensions of the first and second interfaces are identical and characterize the symmetric microbattery. Such a microbattery with identical dimensions of the first and second interfaces is for example described in the document U.S. Pat. No. 5,314,765.

The most commonplace dissymmetric architecture at the present time is characterized by different dimensions of the first and second interfaces.

The documents US-A-2008153000 and WO0173873 describe for example an assembly for a lithium storage battery with an electrolyte layer in contact with the substrate.

In particular, the document US-A-2008032236 describes a microbattery with a dissymmetric electrode, represented in FIG. 1, comprising, on a substrate 1, a stack 2 successively consisting of a first current collector 3, a first electrode 4 covered by a solid electrolyte 5, a second electrode 6 and a second current collector 7. Solid electrolyte 5 extends beyond the perimeter of first electrode 4 so as to overlap on each side of first electrode 4 thereby totally covering the lateral edges thereof. Stack 2 is packaged by a coating 8 that is inert with respect to the elements constituting stack 2 and is designed to make the latter airtight and to protect it against external contamination. It is then possible to move the lithium microbattery and to store it in the open air without any risk of damaging it. A contact connection is then made by depositing a metal layer 9 on coating 8 and coupling with second current collector 7 by means of a through hole made in coating 8. This dissymmetric architecture enables the interface resistances and the mechanical stresses related to the volume expansion of the electrodes to be controlled by adjusting the dimensions of the electrodes and their position in stack 2. It is thus chosen to place the electrodes in stack 2 in such a way that the electrode/electrolyte interface is larger for the electrode having the weaker interface resistance with solid electrolyte 5. Likewise, the electrode subjected to the lower volume expansion will form the first electrode covered by solid electrolyte 5.

The dissymmetric architecture of the prior art does however also present shortcomings. The solid electrolyte 5 that covers first electrode 4 establishes a contact with a part of the surface of first current collector 3 or of substrate 1. This contact results in a decrease of the performances of the microbattery. This shortcoming arises from the more or less large reaction depending on the nature of the electrolyte, of the latter with substrate 1 or with first current collector 3. A non-controlled diffusion phenomenon of the species involved in the electrochemical reactions is further observed, from electrolyte 5 to substrate 1 or first current collector 3.

Other drawbacks affect the performances of dissymmetric microbatteries. In particular, the appearance of mechanical damage to the elements forming the microbattery, in particular the solid electrolyte 5, is observed with use. Operation of the lithium microbattery being based on transportation of the current by the lithium ions, when charging and discharging of the microbattery are performed, the electrodes undergo deformations due to insertion and extraction, also called de-insertion, of the lithium ions in the electrodes. These repeated volume modifications rapidly lead to mechanical damage. Solid electrolyte 5 that completely covers first electrode 4 is more particularly subjected to these volume deformations and is liable to crack, fissure or delaminate.

OBJECT OF THE INVENTION

The object of the invention is to provide a microbattery and the fabrication method of such a microbattery remedying the drawbacks of the prior art.

In particular, the object of the invention is to provide a high-performance lithium microbattery presenting an optimized energy storage efficiency, a moderate electric resistance and a long lifetime. The microbattery is designed to be fabricated by means of an industrial fabrication method that is easy to implement, economically viable and compatible with the technologies implemented in the microelectronics field.

According to the invention, this object is achieved by a lithium microbattery and its fabrication method according to the appended claims.

In particular, this object is achieved by a lithium microbattery wherein the dimensions of the first surface of the solid electrolyte are smaller than the dimensions of the second surface of the solid electrolyte and by the fact that the solid electrolyte is not in contact with the substrate.

According to a preferred embodiment, the first electrode having at least one lateral surface, no lateral surface 14a is completely covered by the solid electrolyte.

According to a preferred embodiment, the electrolyte has a trapezoid shape, in cross-section, with a small base and a large base respectively forming the first and second surface of the electrolyte.

BRIEF DESCRIPTION OF THE DRAWINGS

Other advantages and teachers will become more clearly apparent from the following description of particular embodiments of the invention given for non-restrictive example purposes only and represented in the appended drawings, in which.

DESCRIPTION OF PARTICULAR EMBODIMENTS

Figure 1:
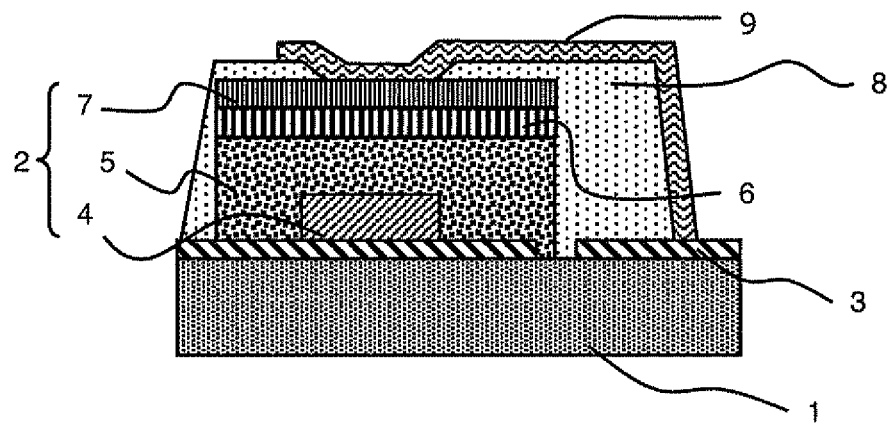
FIG. 1 schematically represents a lithium microbattery according to the prior art, in cross-section.
Figure 2:
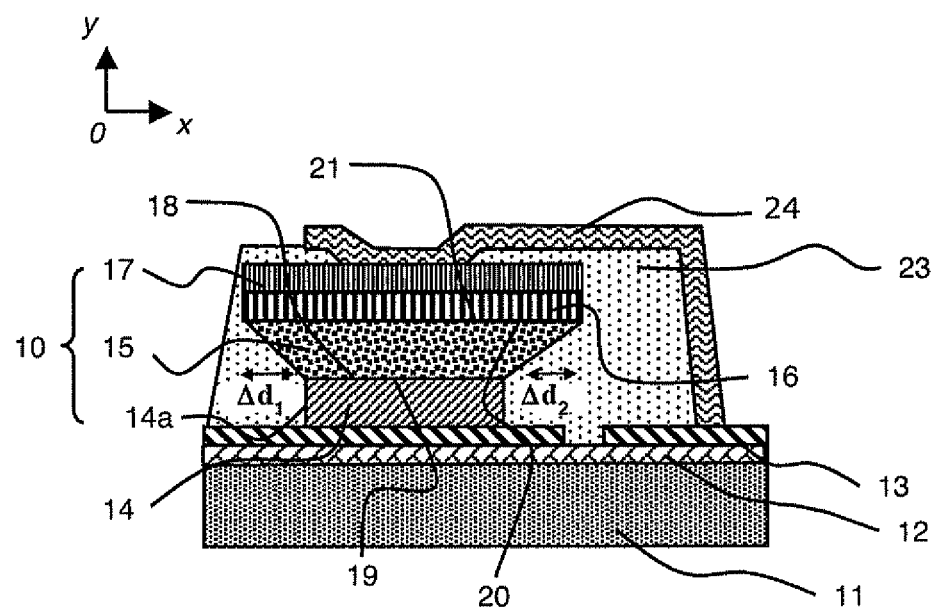
FIG. 2 schematically represents a lithium microbattery according to a particular embodiment of the invention, in cross-section.

With reference to FIG. 2, the microbattery is formed by a stack 10 on a substrate 11. Stack 10 is formed by thin layers advantageously having a thickness of less than 50 µm, preferably less than 10 µm. The lower limit of the thickness of a thin layer is preferably about the thickness of an atomic layer, i.e. a few nanometers.

Substrate 11 can be a silicon wafer or a silicon wafer containing an Application Specific Integrated Circuit (ASIC). Substrate 11 can also be covered by a passivation layer 12 formed by a dielectric such as silicon dioxide ($SiO_2$) or by a bilayer successively formed by a layer of $SiO_2$ and a layer of silicon nitride ($Si_3N_4$). Stack 10 successively comprises a current collector 13, a first electrode 14, a solid electrolyte 15 and a second electrode 16/current collector 17 assembly. Second electrode 16/current collector 17 assembly is formed by at least one thin layer.

According to first particular embodiment, second electrode 16/current collector 17 assembly comprises a thin layer forming second electrode 16 and a thin layer constituting current collector 17. As represented in FIG. 2, current collector 17 is formed on second electrode 16 and solid electrolyte 15 is disposed between first electrode 14 and second electrode 16.

Current collectors 13 and 17 are conventionally made from metal, for example platinum (Pt), chromium (Cr), gold (Au), titanium (Ti), tungsten (W) or molybdenum (Mo).

First electrode 14 can for example be a positive electrode on discharge (cathode) and second electrode 16 be a negative electrode on discharge (anode).

Nevertheless, an architecture where first electrode 14 is a negative electrode and second electrode 16 a positive electrode can also be envisaged.

The materials used as active materials of first electrode 14 can be either non-lithiated materials such as for example copper sulphides or disulphides (Cu or $CuS_2$), tungsten oxysulphides ($WO_yS_z$), titanium disulphides ($TiS_2$), titanium oxysulphides ($TiO_xS_y$) or vanadium oxides ($V_xO_y$), or lithiated materials such as for example lithium-base mixed oxides such as lithium and cobalt oxide ($LiCoO_2$), lithium and nickel oxide ($LiNiO_2$), lithium and manganese oxide ($LiMn_2O_4$), lithium and vanadium pentoxide ($LiV_2O_5$) or lithium and iron phosphate ($LiFePO_4$).

Second electrode 16 preferably consists of one or more materials chosen from transition metals and their alloys, metalloids and their alloys and lithium intercalation or insertion materials. Second electrode 16 can be a $Li^+$ ion generator or also comprise a lithium intercalation active material. The materials used as active material of second electrode 16 can be non-lithiated materials such as for example silicon (Si) and its alloys such as silicon/germanium alloy (SiGe), tin and its alloys such as tin/copper alloy ($Cu_6Sn_5$), carbon or a lithium intercalation or insertion material chosen from tin and silicon oxynitrides (SiTON), tin nitrides ($SnN_x$), indium nitrides ($InN_x$), tin oxides such as tin dioxide ($SnO_2$) or cobalt oxide ($Co_3O_4$). The materials used as active materials of second electrode 16 can be lithiated materials. The material or materials constituting second electrode 16 advantageously comprise less than 30% atomic of lithium. Second electrode 16 can for example be formed by a lithium-base metal alloy containing less than 30% atomic of lithium such as a $SiLi_x$ or $GeLi_x$ alloy or a lithium-base mixed oxide such as lithium and nickel oxide ($LiNiO_2$).

Solid electrolyte 15 consists of a material enabling conduction of the $Li^+$ lithium ions. Electrically insulating and ionic conducting materials should preferably be chosen. Solid electrolyte 15 is preferably a lithium-base compound such as a phosphorus and lithium oxynitride (LiPON) or a lithium phosphosilicate oxynitride (LiSiPON).

Second electrode 16 and current collector 17 consist of one or more materials that are little sensitive to wet process etching.

As represented in FIG. 2, solid electrolyte 15 is disposed between first electrode 14 formed on substrate 11 and second electrode 16.

Current collector 13 can be formed in two parts (FIG. 2). First electrode 14 is then formed on one of the two parts of current collector 13 so that it does not extend beyond the perimeter of this part of current collector 13 and is not in contact with substrate 11 or with passivation layer 12 of substrate 11.

A first surface 18 of electrolyte 15 is in contact with a main surface 19 of first electrode 14 forming a first electrolyte/electrode interface. A second surface 20 of the electrolyte 15 is in contact with a main surface 21 of second electrode 16/current collector 17 assembly forming a second electrolyte/electrode interface. More particularly, second surface 20 of electrolyte 15 is in contact with a main surface 21 of second electrode 16. The main surfaces, respectively 19 and 21, are facing one another and are consequently parallel according to the cross-section represented in FIG. 2. The dimensions of main surface 19 of first electrode 14 are smaller than the dimensions of main surface 21 of second electrode 16/current collector 17 assembly, and more particularly than the dimensions of main surface 21 of second electrode 16.

The first electrolyte/electrode interface is smaller than the second electrolyte/electrode interface. Furthermore, first electrode 14 has at least one lateral surface 14a represented in FIG. 2, perpendicular to main surface 19. Solid electrolyte 15 can extend beyond main surface 19 but does not extend beyond the perimeter of first electrode 14 thereby preventing any contact between solid electrolyte 15 and substrate 11 or passivation layer 12 or current collector 13. When a current collector 13 is disposed between first electrode 14 and substrate 11, electrolyte 15 is not in contact with current collector 13. Furthermore, when substrate 11 has a passivation layer 12, electrolyte 15 is not in contact with passivation layer 12. Consequently, electrolyte 15 is neither in contact with substrate 11 nor with current collector 13 nor with passivation layer 12.

Advantageously, solid electrolyte 15 does not completely cover the whole lateral surface 14a of first electrode 14. In other words, no lateral surface 14a is completely covered by solid electrolyte 15. Thus, for a first electrode 14 with several lateral surfaces 14a, for example in the shape of a cube, none of lateral surfaces 14a is completely covered by solid electrolyte 15.

According to a preferred embodiment, solid electrolyte 15 advantageously covers main surface 19 of first electrode 14 without overlapping on the lateral surface or surfaces 14a of first electrode 14 (right and left sides of electrode 14 in FIG. 2). The dimensions of first surface 18 of electrolyte 15 are substantially equal to the dimensions of main surface 19 of first electrode 14 and the dimensions of second surface 20 of electrolyte 15 are substantially equal to the dimensions of main surface 21 of second electrode 16/current collector 17 assembly. In particular, the dimensions of second surface 20 of electrolyte 15 are substantially equal to the dimensions of main surface 21 of second electrode 16.

The dimensions of first surface 18 of electrolyte 15 are also smaller than the dimensions of second surface 20 of electrolyte 15. The second electrolyte/electrode interface is then larger than the first electrolyte/electrode interface.

As represented in FIG. 2, in cross-section, solid electrolyte 15 advantageously has a trapezoid shape with a small base and a large base respectively constituting a first surface 18 of electrolyte 15 and a second surface 20 of electrolyte 15. What is meant by "trapezoid" is a shape that is like a trapezium. In cross-section, the small base of the trapezoid is closer to substrate 11 than the large base of the trapezoid. The side walls of electrolyte 15 (on the right and left in FIG. 2) thus have a negative slope relatively to the xOy coordinates system (FIG. 2). Furthermore, although the appearance in cross-section of electrolyte 14 may be deformed when electrolyte 15 overspills on each side of first electrode 14, it nevertheless keeps the appearance of a trapezoid.

According to the pattern of the microbattery defining its final form, solid electrolyte 15 has the shape of a reverse pyramid or of an inverted cone, with a truncated apex facing towards substrate 11.

A difference $\Delta d$ between a diameter, width or length of first surface 18 of electrolyte 15 and a diameter, width or length corresponding to second surface 20 of electrolyte 15 is comprised between 0.2 µm and 2000 µm. In particular, for a circular cross-section of the first and second surfaces of electrolyte 15, respectively 18 and 20, the difference $\Delta d$ corresponds to a difference between diameters. For a square cross-section, $\Delta d$ corresponds to a difference between lengths of side, or for a rectangular cross-section to a difference between widths or between lengths. As represented in FIG. 2, difference $\Delta d$ is equal to the sum $\Delta d_1$ and $\Delta d_2$. Preferably, difference $\Delta d$ is distributed uniformly over the whole periphery of solid electrolyte 15, i.e. difference $\Delta d_1$ is equal to $\Delta d_2$.

Stack 10 has a thickness advantageously comprised between 1 µm and 10 µm.

Figure 3:
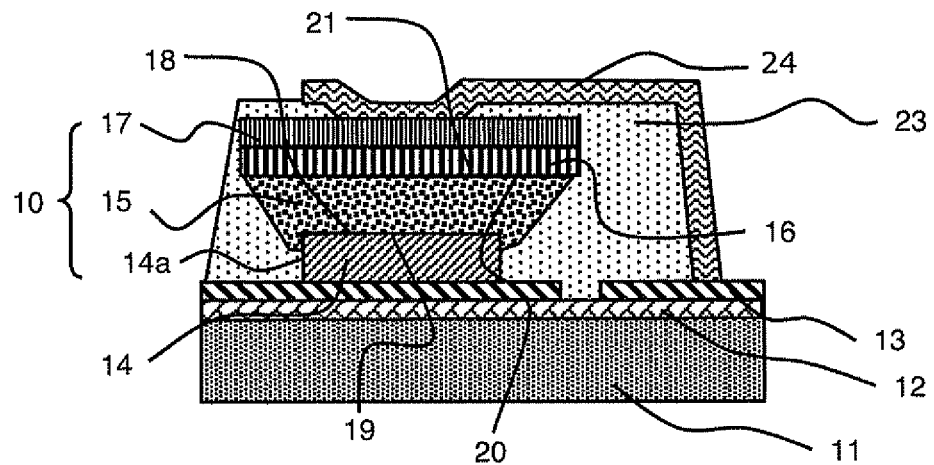
FIGS. 3 and 4 schematically represent a lithium microbattery according to two other particular embodiments, in cross-section.

According to another particular embodiment represented in FIG. 3, solid electrolyte 15 covers main surface 19 of first electrode 14 and overspills onto at least one lateral surface 14a of first electrode 14 so as to only partially cover the latter. Solid electrolyte 15 does not however completely cover the whole lateral surface 14a of first electrode 14 in order to avoid any contact with substrate 11 or passivation layer 12 or current collector 13.

Figure 4:
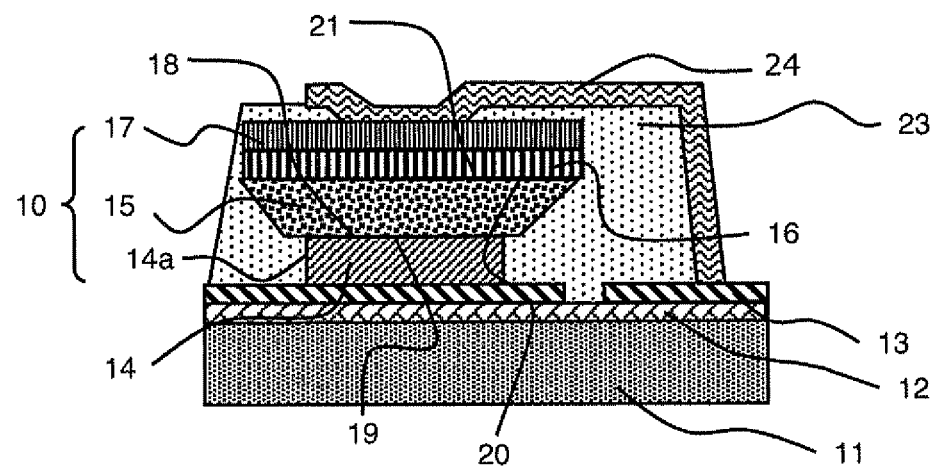

According to another particular embodiment represented in FIG. 4, solid electrolyte 15 covers main surface 19 of first electrode 14 and extends laterally beyond main surface 19 without covering at least one lateral surface 14a of first electrode 14. Solid electrolyte 15 can extend beyond one edge of first electrode 14 only or beyond several of its edges (right and left edges of FIG. 4).

Comparatively to a symmetric architecture, the architectures described above enhance exchanges between the $Li^+$ ions and second electrode 16 while at the same time preventing the risk of diffusion of species between solid electrolyte 15 and substrate 11 or current collector 13.

The lithium microbattery fabrication method successively comprises:
- full wafer deposition of first electrode 14 on substrate 11, and then of solid electrolyte 15 and of at least one thin layer to form second electrode 16/current collector 17 assembly,
- selective etching of second electrode 16/current collector 17 assembly and,
- selective etching, by wet process, of solid electrolyte 15 and of first electrode 14. Wet etching is performed by means of at least one aqueous etching solution.

According to a first particular embodiment represented in FIGS. 5 to 9, the fabrication method comprises production, by means of any known method, of current collector 13 on substrate 11 provided with a passivation layer 12. Current collector 13 can be obtained for example by CVD or PVD deposition followed by photolithography and then wet process etching.

Figure 5:
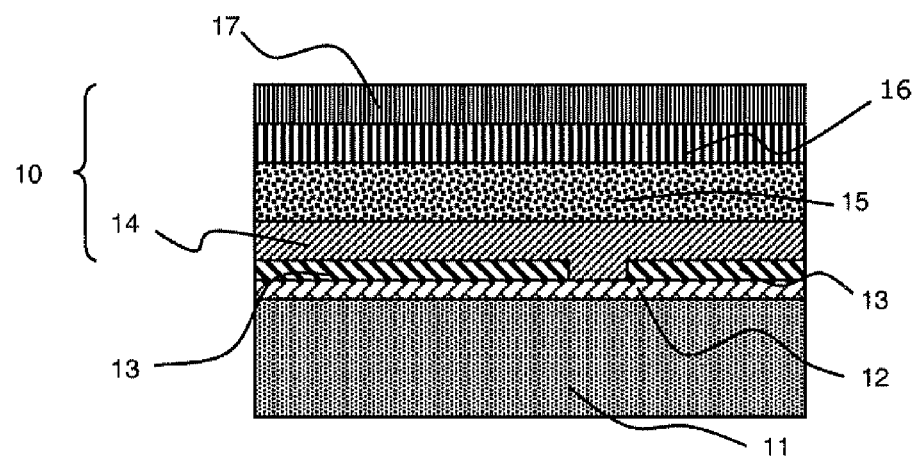
FIGS. 5 to 9 schematically represent different steps of formation of a lithium microbattery according to FIG. 2, in cross-section.
Figure 6:
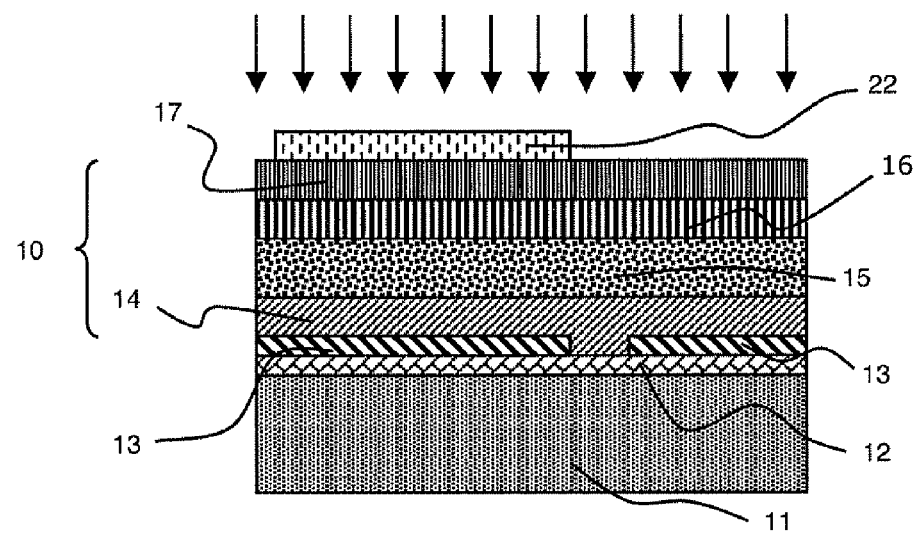

As represented in FIG. 5, first electrode 14, solid electrolyte 15, second electrode 16 and current collector 17 are then deposited full wafer by means of any known method, for example by PVD or CVD deposition, successively on substrate 11, in the form of thin layers. The thin layer forming first electrode 14 then covers current collector 13. The thickness of the thin layers is typically comprised between 0.1 μm and 5 μm.

Figure 7:
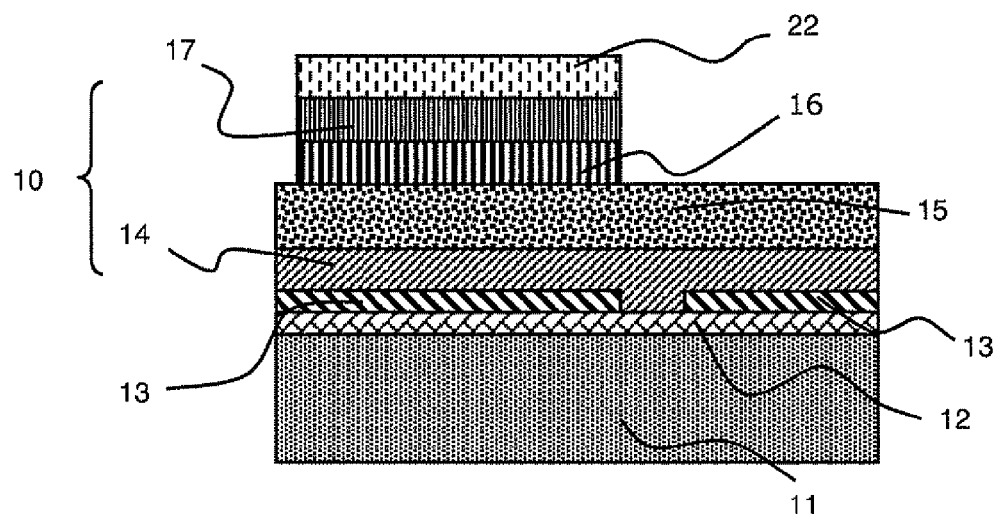

Second electrode 16/current collector 17 assembly comprising a thin layer constituting second electrode 16 and a thin layer constituting current collector 17, the corresponding thin layers are etched simultaneously through at least one mask 22. Mask 22, represented in FIG. 6, which comprises the whole of the pattern of the microbattery, is preferably produced by photolithography on current collector 17. The pattern defined by mask 22 is then transferred into current collector 17 by selective etching, represented schematically by the vertical arrows in FIG. 6. Transfer of the pattern is advantageously performed consecutively in current collector 17 and then in second electrode 16. Current collector 17 and second electrode 16 are consequently etched simultaneously through mask 22. Mask 22 is then eliminated by means of known techniques specific to the nature of mask 22 (FIG. 7).

According to an alternative embodiment, the thin layers constituting current collector 17 and second electrode 16 are etched by two different consecutive etchings, for example wet process etching selective with respect to current collector 17 followed by dry process etching selective with respect to second electrode 16. Two consecutive wet etchings respectively using different chemical etching solutions can also be envisaged. A second mask, not represented, preferably obtained by photolithography, can also be used to selectively etch second electrode 16.

According to another alternative embodiment that is not represented, mask 22 and/or second mask remaining after selective etching of current collector 17 and/or of second electrode 16 are advantageously eliminated in the subsequent step of selective wet etching and do not require specific processing steps.

In the preferred embodiment, selective etching of second electrode 16/current collector 17 assembly is performed by dry process, for example by reactive ion etching (RIE) and/or by wet process. This dry process etching enables a better definition of the patterns and presents a good etching selectivity.

Figure 8:
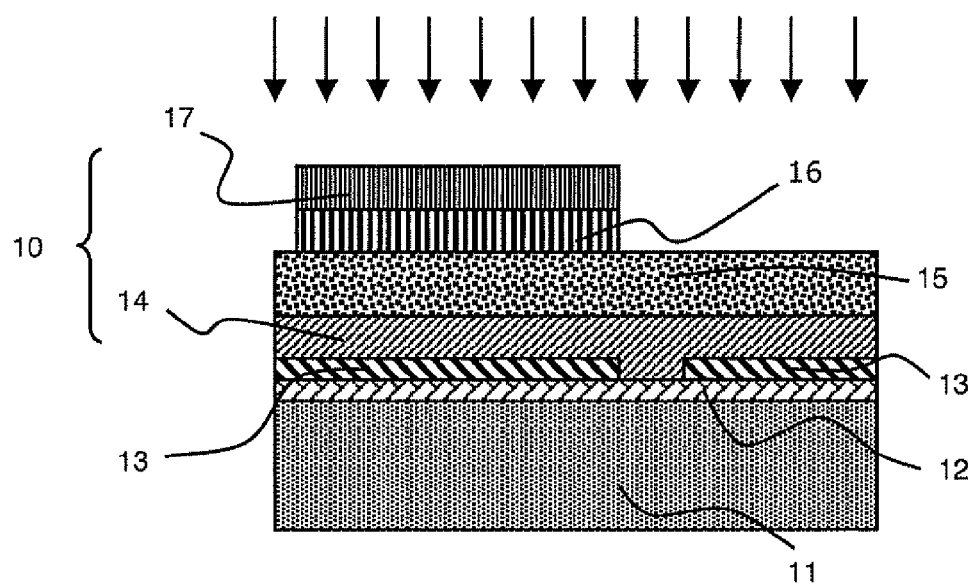

As represented in FIG. 8, solid electrolyte 15 and first electrode 14 are then selectively etched by wet process, by means of any known method, using an aqueous etching solution. Second electrode 16 must not be constituted essentially by metal lithium as the latter is too reactive with respect to the aqueous etching solution.

The wet process etching is selective with respect to solid electrolyte 15 and first electrode 14 (FIG. 8). Current collector 17 and/or second electrode 16 have a hard mask function for this etching step. The pattern is transferred into solid electrolyte 15 and first electrode 14 (FIG. 9).

Figure 9:
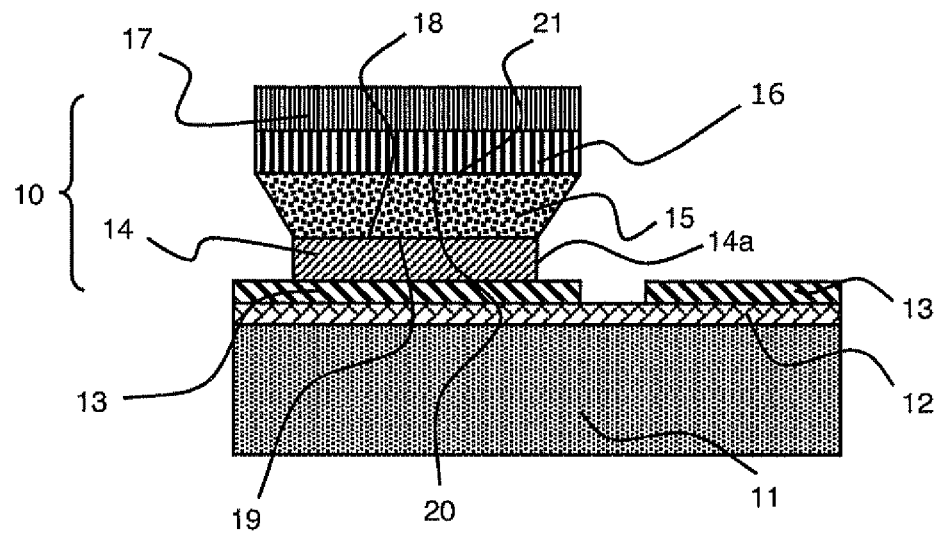

The aqueous nature of the chemical etching solution used for this selective etching enables a characteristic shape of solid electrolyte 15 to be obtained (FIG. 9). As described in the foregoing, the dimensions of first surface 18 of electrolyte 15 are substantially equal to the dimensions of main surface 19 of first electrode 14 and the dimensions of second surface 20 of electrolyte 15 are substantially equal to the dimensions of main surface 21 of second electrode 16/current collector 17 assembly, and the dimensions of first surface 18 of electrolyte 15 are also smaller than the dimensions of second surface 20 of electrolyte 15.

Depending on the nature of the etching solution, selective wet etching of solid electrolyte 15 and of first electrode 14 is advantageously isotropic with different lateral etching rates according to the materials. Thus, solid electrolyte 15 has a trapezoid shape in cross-section with a small base and a large base respectively constituting first and second surfaces, respectively 18 and 20, of electrolyte 15 (FIG. 9).

According to an alternative embodiment that is not represented, first electrode 14 also has a trapezoid shape in cross-section with a small base and a large base respectively constituting an interface formed between current collector 13 and first electrode 14 and an interface formed between first electrode 14 and solid electrolyte 15.

Etching of solid electrolyte 15 is preferably performed using an alkaline aqueous solution and solid electrolyte 15 is advantageously a lithium-base compound, for example LiPON.

Solid electrolyte 15 and first electrode 14 are preferably etched simultaneously by wet process. Thus, to produce the constituent elements of the microbattery, the number of masking steps can be reduced to a single step, the masking step for selective etching of second electrode 16/current collector 17 assembly. This method enables the functional interfaces of the microbattery to be protected when the successive etchings are performed, due to the presence of current collector 17.

Current collectors 13 and 17 having a low sensitivity to the etching solutions used should preferably be chosen.

When an electrode is formed by a lithium-base mixed oxide, a thermal annealing step is sometimes necessary to enhance crystallization of the thin layer forming the electrode and to thereby improve its insertion capacity. For first electrode 14, this annealing step can be performed after full wafer deposition of the thin layer forming the electrode.

Stack 10 is finally encapsulated by a coating 23 and contact connection 24 is made by means of any known process, for example by laser ablation (FIG. 2).

According to a second particular embodiment, the microbattery is a "Li-free" microbattery. Before the first charging of the microbattery, second electrode 16/current collector 17 assembly is initially formed by a thin layer. The latter is constituted by a metal or metal alloy and is devoid of metal lithium. This thin layer forms a plating layer for electrolytic deposition of metal lithium. The lithium deposit is then activated when charging of the microbattery is performed. As described in the document U.S. Pat. No. 6,168,884, before its initial charging, the microbattery does not comprise a thin layer of metal lithium forming second electrode 16. The latter is formed by electrolytic deposition of metal lithium when charging of the microbattery is performed. After the first charging of the microbattery, the second electrode 16/current collector 17 assembly is formed by a thin layer constituting current collector 17 and by a thin layer of metal lithium constituting second electrode 16 (FIG. 2).

The fabrication method of a microbattery according to the second particular embodiment is identical to the first embodiment described above, with the exception that before the first charging of the microbattery, second electrode 16 and current collector 17 being constituted by a single thin layer, etching is selective only with respect to the material forming this thin layer.

For the first particular embodiment described above, i.e. when second electrode 16/current collector 17 assembly is formed by two thin layers, one constituting second electrode 16 and the other constituting current collector 17, second electrode 16 must not be constituted essentially by metal lithium and current collector 17 can be made from metal or from metal alloy. On the other hand, for the second embodiment i.e. in the case of a lithium-free microbattery, a microbattery having a second electrode 16 made from metal lithium is obtained by this method after the first charging. The thin layer of metal lithium in fact is formed after the first charging of the microbattery between solid electrolyte 15 and second electrode 16/current collector 17 assembly. The thin layer of metal lithium then constitutes second electrode 16 and the thin layer initially forming second electrode 16/current collector 17 assembly then constitutes current collector 17 and can be made from metal or from metal alloy. In the fabrication method of the "Li-free" microbattery, metal lithium is at no time present and the aqueous etching solution is also never in contact with metal lithium.

According to a third particular embodiment that is not represented, second electrode 16/current collector 17 assembly consists of a single thin layer. This single thin layer acts both as electrode and as current collector. Second electrode 16/current collector 17 assembly can consist of a thin layer made from metal or from metal alloy, devoid of metal lithium.

The invention is not limited to the embodiments described above. In particular, a microbattery can be produced with a first electrode 14 covering all or part of current collector 13.

In all cases before the first charging of the microbattery, second electrode 16/current collector 17 assembly is not constituted essentially by metal lithium.

EXAMPLE

A lithium microbattery having an optimized architecture has been produced by means of the fabrication method of the invention. A stack 10 is obtained on a silicon substrate 11 with a $SiO_2+Si_3N_4$ passivation bilayer 12. Current collector 13 is formed by deposition of a thin layer of tungsten with a thickness of 250 nm by photolithography followed by wet etching, by immersion in a Tungsten Etch® Bath marketed by Micropur Technic, for 2 minutes at 25° C. Full wafer deposition is then performed successively for formation of the following thin layers:

$LiV_2O_5$ with a thickness of 1 μm forming first electrode 14,
LiPON with a thickness of 1.5 μm forming solid electrolyte 15,
Si with a thickness of 0.1 μm forming second electrode 16,
Ti with a thickness of 0.25 μm forming current collector 17.

Simultaneous etching of current collector 17 and of Ti/Si second electrode 16 is then performed by reactive ion etching with a $SF_6$ plasma in a reactive ion etching reactor under the following conditions: pressure of 25 mTorr; source power of 100 W, self-bias voltage of 180 V, temperature of 80° C., $SF_6$ flowrate of 25 sccm for 300 sec.

Simultaneous wet etching of solid electrolyte 15 and of $LiPON/LiV_2O_5$ first electrode 14 is performed with an alkaline aqueous chemical etching solution. This solution is produced by mixing five volumes of water and one volume of ammoniac at 25° C. for 30 seconds.

Stack 10 formed in this way is packaged by deposition of a photosensitive polymer resin of epoxy type followed by photolithography.

Finally, for the contact connection at the level of second electrode 16, a Ti deposition is made by self-aligned "lift-off" with a positive photosensitive polymer resin S1828 marketed by Shipley and a standard developer of MF319 type marketed by Shipley.

The lithium microbattery obtained presents a dimension of $5\times5$ mm$^2$ with a trapezoid shape of solid electrolyte 15 and a characteristic dimension $\Delta d$ of 100 μm distributed uniformly over the whole periphery of solid electrolyte 15.

Figure 10:
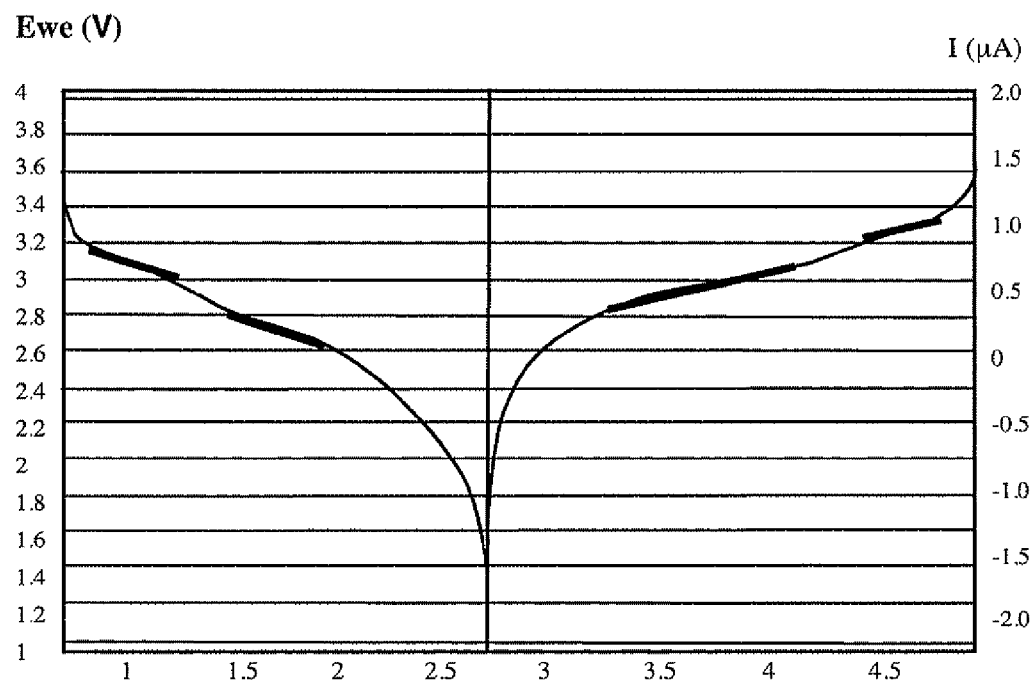
FIG. 10 represents a plot of the galvanostatic cycling curve obtained for a lithium microbattery according to the invention.

FIG. 10 corresponds to cycling in galvanostatic mode of a microbattery fabricated according to the example described in the foregoing. The aspect of the charging and discharging curve corresponds to the redox pairs used. The presence of voltage plateaus at 3.2V and 2.8V, translating the phase transformations in the $LiV_2O_5$ during the lithium insertion process, is noteworthy. Voltage plateaus are observed on charging and discharging which bear witness to the low mechanical stresses involved.

It is known that aqueous solutions are liable to impair lithium-base materials. The whole of the prior art moreover dissuades the use of such etching solutions for wet processing etching of lithium microbatteries, in particular the document US-A-2008032236. Nevertheless, a microbattery architecture with optimized electrochemical performances is surprisingly obtained.

Furthermore, unlike fabrication methods of the prior art which require several often complex steps of deposition and etching of the different layers forming the lithium microbattery, the fabrication method according to the invention is easy to implement and simple. In characteristic manner, the fabrication method uses an aqueous etching solution and a single photolithographic graphic masking step.

Such a fabrication method of a lithium microbattery is compatible with the technologies implemented in the microelectronics field, which in particular enables such a lithium microbattery to be incorporated on a micro-component and fabrication costs to be reduced.

The microbattery according to the invention finds a large number of industrial applications in particular in the microelectronics field where miniaturization of components and autonomy requirements impose the use of smaller, more powerful storage batteries having longer lifetimes. The use of a microbattery according to the invention is in particular recommended for systems where space constraints are of paramount importance, in particular in micro-electronics, in constitution for example of smart cards, smart labels, miniaturized communication tools such as telephones, portable micro-computers, or for power supply of internal clocks and microsystems.

The invention claimed is:

1. A lithium microbattery comprising a stack of solid thin layers on a substrate, said stack successively comprising, starting from the substrate, a first electrode, a solid electrolyte, and a second electrode/current collector assembly formed by at least one thin layer,
   wherein:
   a first surface and a second surface of the electrolyte is in contact respectively with a main surface of the first electrode and a main surface of the second electrode/current collector assembly, said main surfaces facing one another;

dimensions of the main surface of the first electrode are smaller than dimensions of the main surface of said assembly;

dimensions of the first surface of the solid electrolyte are smaller than dimensions of the second surface of the solid electrolyte;

the solid electrolyte is not in contact with the substrate; and the solid electrolyte has a trapezoid shape, in cross-section, with a small base and a large base respectively constituting the first surface and the second surface of the electrolyte.

2. The microbattery according to claim 1, wherein:
the first electrode comprises at least one lateral surface, and no lateral surface is completely covered by the solid electrolyte.

3. The microbattery according to claim 1, wherein:
the dimensions of the first surface of the electrolyte are substantially equal to the dimensions of the main surface of the first electrode, and
the dimensions of the second surface of the electrolyte are substantially equal to the dimensions of the main surface of the second electrode/current collector assembly.

4. The microbattery according to claim 1, wherein a difference between a diameter, width, or length of the first surface of the electrolyte and a corresponding diameter, width, or length of the second surface of the electrolyte is between 0.2 µm and 2000 µm.

5. The microbattery according to claim 1, wherein the solid electrolyte is a lithium-base compound.

6. The microbattery according to claim 1, wherein the second electrode/current collector assembly comprises:
a thin layer constituting the second electrode; and
a thin layer constituting the current collector.

7. The microbattery according to claim 6, wherein the second electrode comprises one or more materials chosen from transition metals and alloys, metalloids and their alloys, and lithium intercalation and insertion materials.

8. The microbattery according to claim 1, wherein the second electrode/current collector assembly consists of a single thin layer.

9. The microbattery according to claim 6, wherein the current collector or the second electrode/current collector assembly consists of a single thin layer made from metal or from metal alloy.

10. A fabrication method of a lithium microbattery according to claim 1, successively comprising:
full wafer deposition, on the substrate, of the first electrode and then of the solid electrolyte and of at least one thin layer to form the second electrode/current collector assembly;
selective etching of said assembly; and
selective etching, by a wet process, of the solid electrolyte and of the first electrode, said wet etching comprising at least one aqueous etching solution to pattern the solid electrolyte in the trapezoid shape, in cross-section, with the small base and the large base respectively contacting the first and the second electrodes.

11. The method according to claim 10, wherein the solid electrolyte and the first electrode are etched simultaneously by the wet process.

12. The method according to claim 10, wherein:
the second electrode/current collector assembly comprises a thin layer constituting the second electrode and a thin layer constituting the current collector, and
said thin layers are etched simultaneously through at least one mask.

13. The method according to claim 10, wherein:
the solid electrolyte is a lithium-base compound; and
the aqueous etching solution is an alkaline solution.

14. The method according to claim 10, wherein selective etching of the second electrode/current collector assembly is a dry process etching.

15. A lithium microbattery comprising a stack of solid thin layers on a substrate, said stack successively comprising, starting from the substrate, a first electrode, a solid electrolyte, and a second electrode/current collector assembly formed by at least one thin layer,
wherein:
a first surface and a second surface of the electrolyte is in contact respectively with a main surface of the first electrode and a main surface of the second electrode/current collector assembly, said main surfaces facing one another;
dimensions of the main surface of the first electrode are smaller than dimensions of the main surface of said assembly;
dimensions of the first surface of the solid electrolyte are smaller than dimensions of the second surface of the solid electrolyte;
the dimensions of the first surface of the electrolyte are substantially equal to the dimensions of the main surface of the first electrode;
the dimensions of the second surface of the electrolyte are substantially equal to the dimensions of the main surface of the second electrode/current collector assembly;
the dimensions of the first surface of the electrolyte are smaller than the dimensions of the second surface of the electrolyte; and
the solid electrolyte is not in contact with the substrate.

16. The microbattery according to claim 15, wherein:
the first electrode comprises at least one lateral surface, and no lateral surface is completely covered by the solid electrolyte.

17. The microbattery according to claim 15, wherein the solid electrolyte has a trapezoid shape, in cross-section, with a small base and a large base respectively constituting the first surface and the second surface of the electrolyte.

18. The microbattery according to claim 15, wherein a difference between a diameter, width, or length of the first surface of the electrolyte and a corresponding diameter, width, or length of the second surface of the electrolyte is between 0.2 µm and 2000 µm.

19. The microbattery according to claim 15, wherein the solid electrolyte is a lithium-base compound.

20. The microbattery according to claim 15, wherein the second electrode/current collector assembly comprises:
a thin layer constituting the second electrode; and
a thin layer constituting the current collector.

21. The microbattery according to claim 20, wherein the second electrode comprises one or more materials chosen from transition metals and alloys, metalloids and their alloys, and lithium intercalation and insertion materials.

22. The microbattery according to claim 15, wherein the second electrode/current collector assembly consists of a single thin layer.

23. The microbattery according to claim 20, wherein the current collector or the second electrode/current collector assembly consists of a single thin layer made from metal or from metal alloy.

* * * * *